(12) United States Patent
Chang

(10) Patent No.: US 6,671,498 B2
(45) Date of Patent: Dec. 30, 2003

(54) FREQUENCY TRACKING AND LOCKING SYSTEM OF A WIRELESS MICROPHONE

(75) Inventor: Jen-Cheng Chang, Chia-Yi (TW)

(73) Assignee: Mipro Electronics Co., Ltd., Chia Yi (TW)

( * ) Notice: Subject to any disclaimer, the term of this patent is extended or adjusted under 35 U.S.C. 154(b) by 546 days.

(21) Appl. No.: 09/734,933

(22) Filed: Dec. 11, 2000

(65) Prior Publication Data

US 2002/0072338 A1 Jun. 13, 2002

(51) Int. Cl.[7] .............................................. H04B 1/02
(52) U.S. Cl. ........................... 455/93; 455/95; 455/118
(58) Field of Search ............................ 455/91, 93, 95, 455/100, 108, 110, 112, 116, 118, 119; 381/122, 355

(56) References Cited

U.S. PATENT DOCUMENTS 5,051,799 A * 9/1991 Paul et al. ................... 375/242
6,560,469 B1 * 5/2003 Kim et al. ................. 455/569.1

* cited by examiner

Primary Examiner—Nguyen T. Vo
(74) Attorney, Agent, or Firm—Alan D. Kamrath; Rider Bennett, LLP

(57) ABSTRACT

A frequency tracking and locking system of a wireless microphone has a frequency selection unit selecting a predetermined frequency and outputting the predetermined frequency to the frequency data storage unit, a frequency data storage unit storing a predetermined frequency data and outputting the predetermined frequency data to the data encoding unit, the data encoding unit encoding the predetermined frequency data and outputting the predetermined frequency data to the infrared modulation transmitter, an infrared modulation transmitter transforming the predetermined frequency data to the infrared frequency data and transmitting the infrared frequency data to the data decoding unit, a data decoding unit decoding the infrared frequency data to a first radio frequency and outputting the first radio frequency to the frequency transformation unit, a frequency transformation unit transforming the first radio frequency to a second radio frequency and outputting the second radio frequency to the radio emission unit, and a radio emission unit emitting the second radio frequency.

1 Claim, 1 Drawing Sheet

FREQUENCY TRACKING AND LOCKING SYSTEM OF A WIRELESS MICROPHONE

BACKGROUND OF THE INVENTION

The present invention relates to a frequency tracking and locking system of a wireless microphone. More particularly, the present invention relates to a frequency tracking and locking system of a wireless microphone which uses a radio data transmission method to track and lock a varied channel automatically.

A conventional frequency tracking and locking system of a wireless microphone is a multi-channel system. However, it is cumbersome to track and lock frequencies in different channels for various types of microphones.

SUMMARY OF THE INVENTION

An object of the present invention is to provide a frequency tracking and locking system of a wireless microphone which uses a radio data transmission method to track and lock a varied channel automatically.

Accordingly, a frequency tracking and locking system of a wireless microphone comprises a frequency selection unit, a frequency data storage unit, a data encoding unit, an infrared modulation transmitter, a data decoding unit, a frequency transformation unit, and a radio emission unit. The frequency selection unit selects a predetermined frequency and outputs the predetermined frequency to the frequency data storage unit. The frequency data storage unit stores a predetermined frequency data and outputs the predetermined frequency data to the data encoding unit. The data encoding unit encodes the predetermined frequency data and outputs the predetermined frequency data to the infrared modulation transmitter. The infrared modulation transmitter transforms the predetermined frequency data to the infrared frequency data and transmits the infrared frequency data to the data decoding unit. The data decoding unit decodes the infrared frequency data to a first radio frequency and outputs the first radio frequency to the frequency transformation unit. The frequency transformation unit transforms the first radio frequency to a second radio frequency and outputs the second radio frequency to the radio emission unit. The radio emission unit emits the second radio frequency.

DETAILED DESCRIPTION OF THE INVENTION

Figure 1:
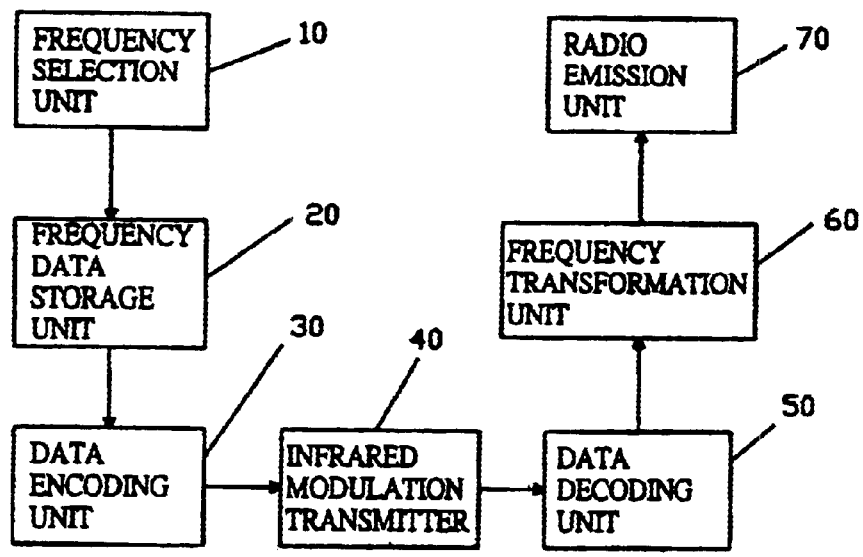
FIG. 1 is a block diagram of a frequency tracking and locking system of a wireless microphone of a preferred embodiment in accordance with the present invention.
Figure 2:
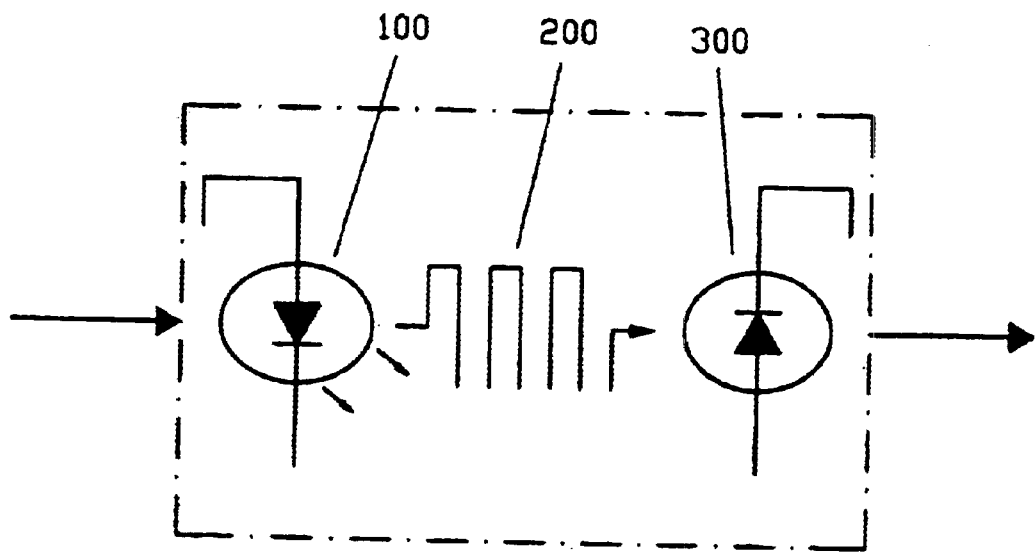
FIG. 2 is a schematic diagram of an infrared modulation transmitter of a preferred embodiment in accordance with the present invention.

Referring to FIGS. 1 and 2, a frequency tracking and locking system of a wireless microphone comprises a frequency selection unit 10, a frequency data storage unit 20, a data encoding unit 30, an infrared modulation transmitter 40, a data decoding unit 50, a frequency transformation unit 60, and a radio emission unit 70.

The infrared modulation transmitter 40 has an infrared photoelectric semiconductor 100, an infrared frequency 200, and an infrared photoelectric detector 300.

The frequency selection unit 10 selects a predetermined frequency and outputs the predetermined frequency to the frequency data storage unit 20.

The frequency data storage unit 20 stores a predetermined frequency data and outputs the predetermined frequency data to the data encoding unit 30.

The data encoding unit 30 encodes the predetermined frequency data and outputs the predetermined frequency data to the infrared modulation transmitter 40.

The infrared modulation transmitter 40 transforms the predetermined frequency data to the infrared frequency data and transmits the infrared frequency data to the data decoding unit 50.

The data decoding unit 50 decodes the infrared frequency data to a first radio frequency and outputs the first radio frequency to the frequency transformation unit 60.

The frequency transformation unit 60 transforms the first radio frequency to a second radio frequency and outputs the second radio frequency to the radio emission unit 70.

The radio emission unit 70 emits the second radio frequency.

The invention is not limited to the above embodiment but various modification thereof may be made. Further, various changes in form and detail may be made without departing from the scope of the invention.

I claim:

1. A frequency tracking and locking system of a wireless microphone comprises:

a frequency selection unit, a frequency data storage unit, a data encoding unit, an infrared modulation transmitter, a data decoding unit, a frequency transformation unit, and a radio emission unit, the frequency selection unit selecting a predetermined frequency and outputting the predetermined frequency to the frequency data storage unit, the frequency data storage unit storing a predetermined frequency data and outputting the predetermined frequency data to the data encoding unit, the data encoding unit encoding the predetermined frequency data and outputting the predetermined frequency data to the infrared modulation transmitter, the infrared modulation transmitter transforming the predetermined frequency data to the infrared frequency data and transmitting the infrared frequency data to the data decoding unit, the data decoding unit decoding the infrared frequency data to a first radio frequency and outputting the first radio frequency to the frequency transformation unit, the frequency transformation unit transforming the first radio frequency to a second radio frequency and outputting the second radio frequency to the radio emission unit, and the radio emission unit emitting the second radio frequency.

* * * * *